Figure 5:
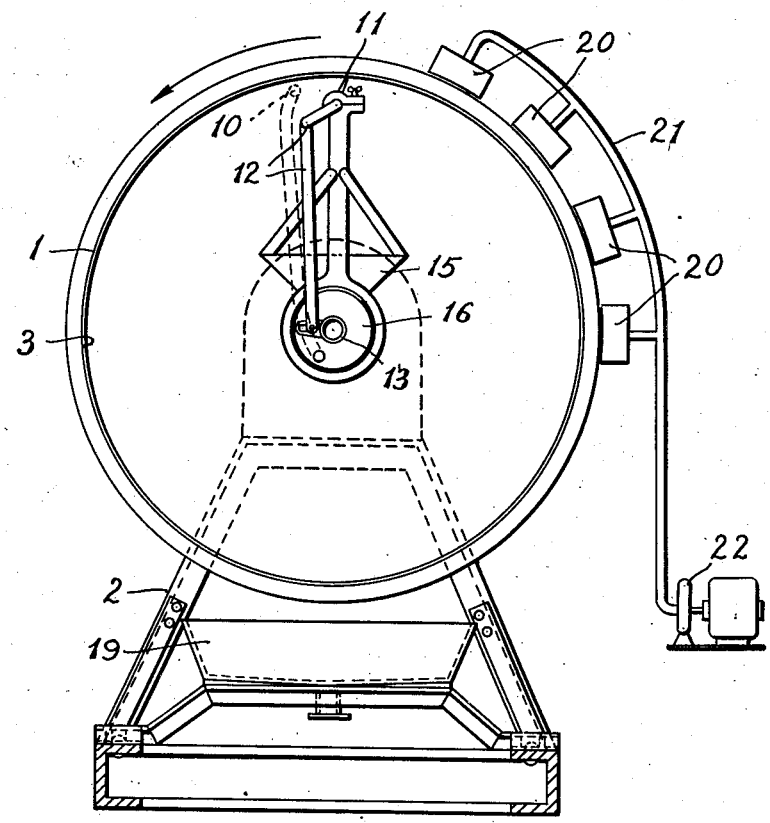

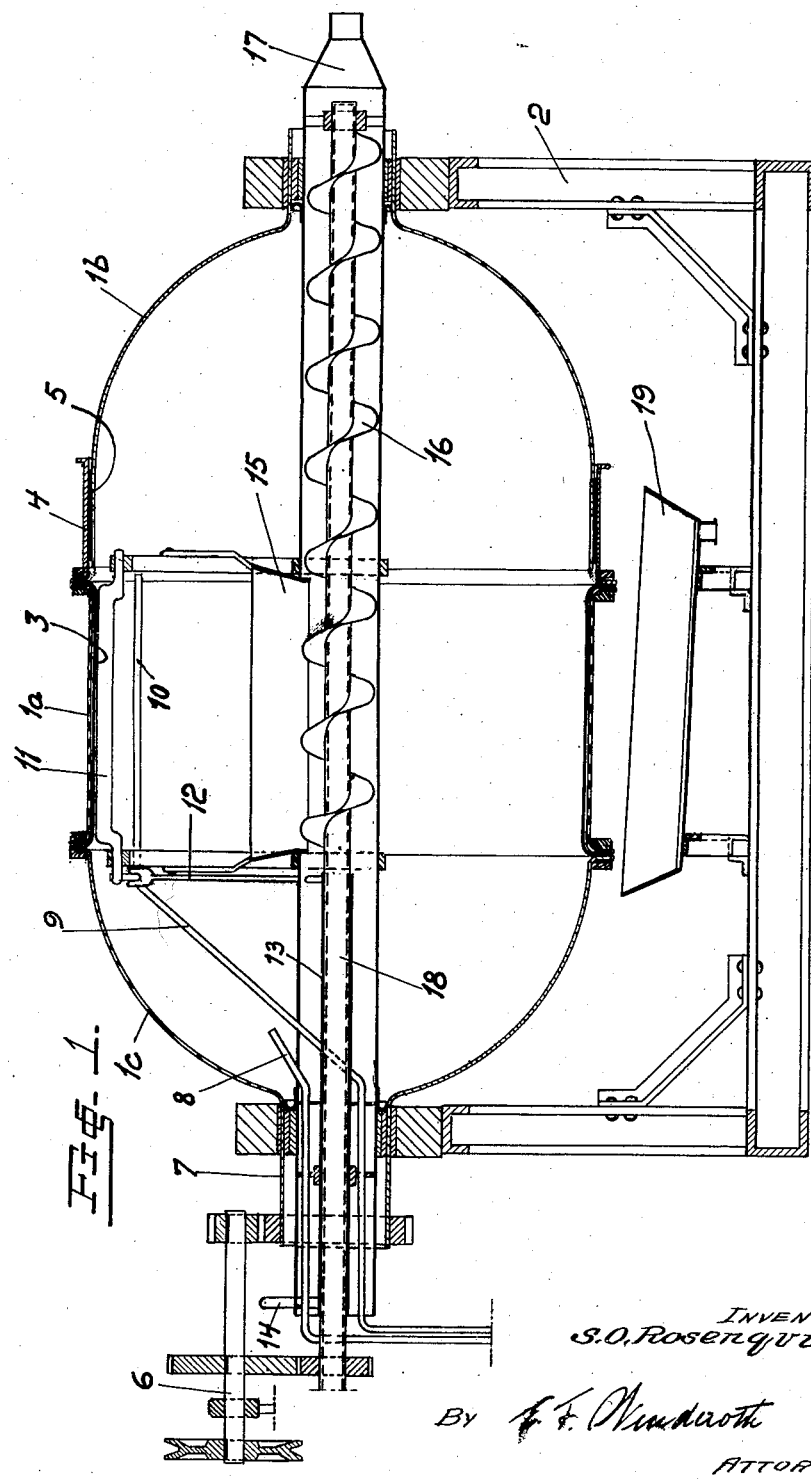

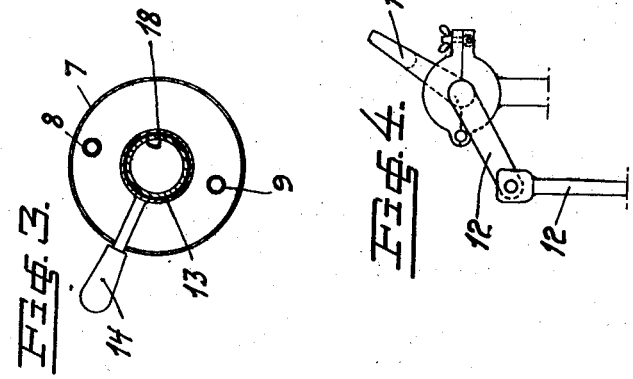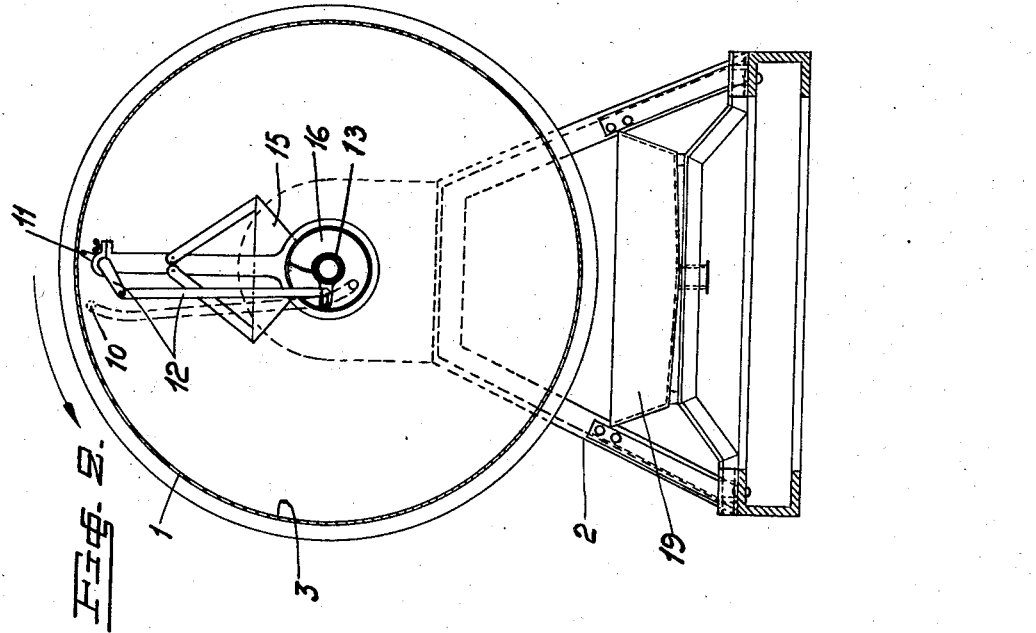

Patented Mar. 26, 1946

2,397,436

UNITED STATES PATENT OFFICE 2,397,436

MEANS FOR EXTRACTING OR EXPELLING WATER AND OTHER LIQUIDS FROM YEAST SUSPENSIONS

Sven Olof Rosenqvist, Rotebro, Sweden, assignor to Svenska Jästfabriks Aktiebolaget, Stockholm, Sweden, a company of Sweden Application March 27, 1942, Serial No. 436,542
In Sweden February 21, 1941

6 Claims. (Cl. 210—199)

This invention relates to a process and an apparatus for extracting or expelling water and other liquids from yeast suspensions. Hitherto, it has been usual to dewater yeast suspensions such as yeast concentrate by pressing in filter presses and, in certain cases, also in rotating vacuum filters. The first-mentioned method, however, cannot be performed in continuous operation, and, moreover, the apparatus involved are rendered bulky and heavy. On the other hand, it is not possible with the aid of rotating vacuum filters to attain the consistency or degree of dewatering which is desirable for certain purposes. It should also be noted that vacuum filters are expensive in manufacture, inasmuch as they need to be constructed so as to withstand an internal vacuum.

These disadvantages are obviated through the present invention, which enables the yeast to be dewatered to the desired degree or consistency entirely satisfactorily in continuous operation. According to the main features of the invention the yeast suspension is introduced into a movable filter chamber operating with internal pressure, and is caused to deposit or adhere to the internal wall of such chamber, liquid being expelled or separated from the yeast by means of the pressure prevailing in the filter, whereupon the dewatered yeast mass is removed from the filter chamber. By this method the drawbacks incident to the presses hitherto employed in the manufacture of yeast are avoided, in that the yeast intended to be dewatered will not, according to the invention, be subjected to any material internal friction during the pressing or dewatering operation, and, as a consequence of this fact, its consistency will not involve any difficulties in the taking-off operation or in the continued treatment in packeting machines and so forth upon the termination of the dewatering process. Furthermore, the use of a filter with an internal pressure involves the advantage that it will be possible without difficulty to use a pressure as high as required for the desired degree of water expulsion, without it being necessary to make the construction complicated or expensive from the point of view of strength.

The invention also relates to means suited for carrying the above-mentioned method into effect, said means comprising one or more movable filter chambers operating with an internal pressure, supply means to apply the yeast suspension onto the inner surface of the filter chamber, adjustable means for taking off the yeast from said surface after having been dewatered to the desired degree, and means in the form of a continuously driven conveying member (such as a conveyor screw or the like) to discharge the dewatered yeast from the filter chamber.

Further features and advantages of the invention will appear from the following description with reference to the accompanying drawings illustrating a drum filter by way of diagrammatic representation, said filter being adapted for use in connection with the process according to the invention. Fig. 1 shows a longitudinal section of the filter and Fig. 2 a cross section thereof. Figs. 3 and 4 represent some detail views. Fig. 5 shows a diagrammatical cross-section through a modified embodiment of the invention.

In the example of embodiment shown, the drum 1 is mounted in a frame 2, and preferably comprises an approximately cylindrical (or polyhedrical) central portion 1a and two, preferably semi-spherical head members 1b, 1c connected thereto. The cylindrical portion 1a consists of a perforated casing or envelope and is (preferably on the inside thereof) provided with filter cloth 3. This filter cloth may be attached between the flanges of the portion 1a and the head members 1b and 1c respectively, so as to serve the additional function of tightening means. In order to facilitate access to the interior of the drum in a simple manner, without the retaining bolts for the flanges having to be loosened, one head member 1b may be made without any flange, as shown in the drawings, and is adapted to be displaced within a reinforcement 4 connected with the cylindrical portion 1a. A packing 5 is provided between the reinforcement 4 and said head member 1b, and the requisite tightening effect will be obtained in operation by the fact that the head member plate is pressed outwardly against the packing 5 by the pressure prevailing within the drum. If it is desired to remove the head member 1b, this is simply effected by pulling out the same after the pressure has been relieved. Obviously, other tightening and attaching means may come into consideration as well.

The drum is brought into rotary movement from any suitable source of power as indicated diagrammatically at 6. The source of power is adapted to drive a sleeve 7 connected with the head member 1c. Provided within this sleeve is a conduit 8 for compressed air or compressed gas, as well as a conduit 9 for the yeast mass or suspension which is to be dewatered or separated from water or other liquid. The pressure conduit 8 opens at a suitable point within the drum, so as to maintain an air or gas pressure within said drum. The conduit 9 is preferably connected to one or more spraying pipes 10, or to any other spraying means provided in the propinquity of the filter surface, for instance at the upper portion thereof, but other places may come into consideration as well. The suspension entering through the spraying pipe adheres to the inside of the filter wall and follows with the latter in the rotation thereof, and during this rotation the layer of suspension deposited is subjected to the pressure (above atmospheric) prevailing within the drum, so that liquid will be expelled or extracted in the desired quantity. The filter cake formed is scraped or taken off continuously by means of a scraping or taking off device which is preferably arranged at a peripheral distance as great as possible (counted in the direction of rotation of the drum) from the point at which the suspension is applied onto the filter cloth. By this means a large turn-out capacity may be obtained. In the example of embodiment shown, the scraping device consists of a knife 11. As it is important that this knife be adjustable relatively to the filter surface to facilitate a more or less thick basic layer to be left on the filter cloth, the knife is preferably connected to an operating device adapted to be actuated from the outside and consisting, for instance, of a linkage 12 connected to a sleeve 13 or the like adapted to be turned independently of the rotation of the drum. The turning movement may be effected by means of a handle 14 on the sleeve.

The mass scraped off falls down into a trough 15 beneath the knife and is fed from the drum in any suitable manner, for instance by means of a conveying helix 16 adapted to convey the material out through a nozzle 17 at one end of the drum. This nozzle may be connected directly with a packeting machine or the like for the finished yeast material. Preferably, the shaft 18 of the screw 16 extends through the sleeve 13 and may, with the insertion of a suitable gearing, be operated from the same driving means as the drum.

The liquid extracted through the filter is drained off along the outside of the filter, and may be collected and carried away by means of a collecting receptacle 19 or the like.

The invention is not limited to the construction illustrated and described, but may be modified in a number of ways, without departing from the scope of the invention. In many cases it may be found suitable to arrange one or more suction chambers on the outside of the filter in the zone where the mass is applied onto the filter surface. Such external vacuum involves the advantage that the mass will adhere more easily to the filter surface. An embodiment of this kind is shown in Fig. 5, in which the said suction chambers shown at 20 are connected with a suction conduit 21 communicating with a source of suction 22.

As many changes could be made in the above method and construction and many apparently widely different embodiments of the invention could be made without departing from the scope thereof, as defined by the following claims, it is intended that all matter contained in the above description shall be interpreted as illustrative and not in a limiting sense. In the claims, the term "movable filter" is to be understood as including a construction in which the spraying means and the scraping means are movable in relation to the filter surface. The term "gas pressure" is, moreover, intended to include "air pressure" within the scope thereof.

What I claim is:

1. Means for dewatering yeast suspension, comprising in combination a rotatable drum constituting a filter chamber and including a perforated wall section through which filtered liquid may pass, means for establishing superatmospheric gas pressure in said chamber, a supplying device extending into said filter chamber to apply yeast suspension onto the inner surface of said wall section, an adjustable scraper arranged in said chamber in juxtaposition to said inner surface to take the dewatered yeast off said inner surface, and a continuously driven conveying device for receiving the dewatered yeast from said scraper and for removing the yeast from the filter chamber, and means for adjusting said scraper during the filtering operation.

2. Means for dewatering yeast suspension, comprising in combination, a movable drum constituting a filter chamber and including a perforated wall section through which filtered liquid may pass, means for establishing superatmospheric gas pressure therein, a spraying device extending into said chamber for applying yeast suspension onto the inner surface of said wall section, adjustable means arranged in said chamber in juxtaposition to said inner surface to take the dewatered yeast off said inner surface, and a continuously driven conveying device having an inlet in substantial alinement with said adjustable means to receive and to remove the yeast from the filter chamber, said taking-off means being adjustable relatively to the said inner surface, and means for effecting said adjustment operable from the outside of the said chamber.

3. Means as claimed in claim 1, and at least one suction chamber arranged on the outside of said filter chamber in the propinquity of said supplying device for the purpose of maintaining an external vacuum thereabout.

4. Means for dewatering yeast suspension, comprising in combination a rotatable drum constituting a filter chamber and including a perforated wall section through which filtered liquid may pass, means for establishing superatmospheric gas pressure in said chamber, a supplying device extending into said chamber for applying yeast suspension onto the inner surface of said wall section, taking-off means adjustable relatively to said inner surface and located in said chamber at a peripheral distance from said supplying device approximately amounting to a whole revolution in the direction of rotation of said filter chamber, means for adjusting said taking-off means during the filtering operation, and continuously driven conveying means having an inlet to receive and to remove the dewatered yeast from the said filter chamber.

5. Means for dewatering yeast suspension, comprising in combination a rotatable drum constituting a filter chamber and including a perforated wall section through which filtered liquid may pass, means for establishing superatmospheric gas pressure in said chamber, a supplying device extending into said chamber for applying yeast suspension onto the inner surface of said wall section, a taking-off scraper for the dewatered yeast and adjustable relatively to said inner surface and located in said chamber at a peripheral distance approximating a whole revolution of said filter chamber from said supplying device, means for adjusting said scraper operable from the outside of said filter chamber, and continuously driven screw conveying means having an inlet in substantial alinement with said adjustable scraper to receive and to remove the dewatered yeast from said filter chamber.

6. Means for dewatering yeast suspension, comprising in combination a rotatable drum constituting a filter chamber and including a perforated wall section through which filtered liquid may pass, means for establishing superatmospheric gas pressure in said chamber, a supplying device extending into said chamber for applying yeast suspension onto the inner surface of said wall section, a taking-off scraper for the dewatered yeast and adjustable relatively to said inner surface and located in said chamber at a peripheral distance approximating a whole revolution of said rotatable filter chamber from said supplying device, means for adjusting said scraper operable from the outside of said filter chamber, a continuously driven screw conveying means having an inlet in substantial alinement with said adjustable means to receive and to remove the dewatered yeast from the filter chamber, and at least one suction chamber on the outside of the filter chamber in the propinquity of the supplying device for the purpose of maintaining an external vacuum thereabout.

SVEN OLOF ROSENQVIST.